United States Patent
Shi et al.

(10) Patent No.: US 8,644,282 B2
(45) Date of Patent: Feb. 4, 2014

(54) SYSTEM AND METHOD FOR TRANSMITTING A LOW DENSITY PARITY CHECK SIGNAL

(75) Inventors: Kai Shi, Sunnyvale, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 13/233,822

(22) Filed: Sep. 15, 2011

(65) Prior Publication Data

US 2012/0069830 A1   Mar. 22, 2012

Related U.S. Application Data

(60) Provisional application No. 61/383,615, filed on Sep. 16, 2010.

(51) Int. Cl.
*H04W 4/00* (2009.01)
*H04L 5/04* (2006.01)
*H04L 12/16* (2006.01)

(52) U.S. Cl.
USPC .................... 370/338; 370/206; 370/260

(58) Field of Classification Search
USPC .............. 370/206, 338; 375/260–261, 267
See application file for complete search history.

(56) References Cited

U.S. PATENT DOCUMENTS

| | | | |
|---|---|---|---|
| 7,664,008 B2 * | 2/2010 | Stolpman et al. | 370/203 |
| 7,668,224 B2 * | 2/2010 | Hocevar et al. | 375/130 |
| 7,668,248 B2 * | 2/2010 | Hocevar | 375/260 |
| 7,773,690 B2 * | 8/2010 | Hoo et al. | 375/295 |
| 8,261,150 B2 * | 9/2012 | Murakami et al. | 714/749 |
| 2005/0246616 A1 * | 11/2005 | Choi et al. | 714/801 |
| 2007/0038914 A1 | 2/2007 | Bickerstaff et al. | |
| 2007/0041458 A1 * | 2/2007 | Hocevar et al. | 375/260 |
| 2007/0086539 A1 * | 4/2007 | Hocevar | 375/267 |
| 2008/0008083 A1 * | 1/2008 | Stolpman et al. | 370/206 |
| 2010/0309834 A1 * | 12/2010 | Fischer et al. | 370/312 |
| 2011/0026623 A1 * | 2/2011 | Srinivasa et al. | 375/260 |
| 2012/0304035 A1 * | 11/2012 | Murakami et al. | 714/752 |

OTHER PUBLICATIONS

International Search Report and Written Opinion—PCT/US2011/051939—ISA/EPO—Feb. 2, 2012.

* cited by examiner

*Primary Examiner* — Asad Nawaz
*Assistant Examiner* — Berhanu Belete
(74) *Attorney, Agent, or Firm* — Bever, Hoffman & Harms, LLP

(57) ABSTRACT

A system and method for transmitting LDPC parameters is provided. In the method, an initial number of OFDM symbols (Nsym_init) is determined for a packet that is based on the number of information bits to be delivered in the packet. An STBC value is also determined. A number of extra symbols (Nsym_ext) value is generated based on the Nsym_init value, wherein a Nsym value is based on said Nsym_init value and said Nsym_ext value. An Nldpc_ext value is determined based on the STBC value and the Nsym_ext value for purposes of determining LDPC parameters associated with the packet.

13 Claims, 6 Drawing Sheets

SYSTEM AND METHOD FOR TRANSMITTING A LOW DENSITY PARITY CHECK SIGNAL

CROSS REFERENCE TO RELATED APPLICATIONS

This application claims priority to and the benefit of the commonly owned, provisional patent application, U.S. Ser. 61/383,615, entitled "METHODS AND SYSTEMS FOR TRANSMITTING A LOW DENSITY PARITY CHECK SIGNAL," with filing date Sep. 16, 2010, which is herein incorporated by reference in its entirety.

BACKGROUND

The Institute of Electrical and Electronics Engineers (IEEE) 802.11 standards provide a set of wireless local area network (WLAN) standards for relatively short-range communications ranging from tens of meters to a few hundred meters. With the IEEE 802.11 standard, data rates as high as 300 Mbps (megabits per second) are achievable over a defined frequency range. The 802.11ac standard, currently under development, aims to triple that data rate.

The history of IEEE 802 wireless standards begins with the IEEE 802.11a/b/g standards implemented from 1997 to 2003. In 2009, the IEEE 802.11n standard introduced substantial enhancements to WLAN performance, efficiency and robustness of the IEEE 802.11 physical (PHY) and medium access control (MAC) layers. In particular, 802.11n introduced a new multi-streaming modulation technique. As such, products designed in compliance with the IEEE 802.11n standard achieved by as much as five times the throughput and up to double the range over legacy IEEE 802.11a/b/g technologies.

The currently proposed IEEE 802.11ac standard provides further improvements to the IEEE 802.11n standard. The IEEE 802.11ac standard will continue to work in the five gigahertz (GHz) band, but will provide larger channels for data throughput. Devices based on IEEE 802.11ac will be using channels that are either 40 megahertz (MHz) or 80 MHz wide, and perhaps even 160 MHz wide, to deliver data. Devices based on IEEE 802.11ac may also make use of multiple user, multiple inputs, multiple outputs (MU-MIMO) to transmit simultaneous data streams to different users on the same channels.

In the IEEE 802.11n standard, a low density parity-check (LDPC) code has been adopted for use as an error correcting code. LDPC is a class of linear block codes, and provides for linear error correcting. As such, LDPC provides a method for transmitting messages over noisy transmission channels without losing information. LDPC codes can be decoded in time linear to their block length. As such, LDPC encoding in compliance with IEEE 802.11n by the transmitting device allows the receiving device to derive all LDPC parameters in a packet.

In the proposed IEEE 802.11ac standard, the conventional LDPC encoding process may be changed. The proposed changes can create problems for LDPC decoding on the receive side. For instance, the receiving device may not recognize some signaling components (e.g., LDPC coding parameters) that result from the aforementioned changes. In addition, even if the receiving device recognizes these new signaling components, mapping issues may remain between LDPC components.

SUMMARY

Embodiments of the present invention generally relate to LDCP encoding and decoding between transmitting and receiving devices, and provide for methods and systems for transmitting an LDPC signal.

In one embodiment, a method for providing an LDPC signal accesses data in an encoding operation and associates information with the data to determine LDPC coding parameters. Access is provided to the information that is used to determine coding parameters. More particularly, the method includes determining an initial number of OFDM symbols (Nsym_init) at a transmitting device, based on the number of information bits to be delivered in a packet. A determination is made as to whether space time block coding (STBC) is employed, as reflected in an STBC value. A number of extra symbols (Nsym_ext) value is determined that is based on the Nsym_init value. A final number of symbols ($N_{sym}$) value is based on the Nsym_init value and the Nsym_ext value. Additionally, an Nldpc_ext value is generated based on the STBC value and the Nsym_ext value for purposes of determining LDPC parameters associated with the packet.

In another embodiment, a device for handling an information packet is disclosed, wherein the information packet includes an Nsym value that provides the number of OFDM symbols, and an STBC value that indicates whether STBC is implemented. In addition, an Nldpc_ext value is generated based on the STBC value and a number of extra symbols (Nsym_ext) value that is determined for the information packet. The Nldpc_ext value is based on an initial number of OFDM symbols (Nsym_init), wherein the Nldpc_ext value is used for purposes of determining LDPC parameters associated with the packet.

In still another embodiment, a system for LDPC encoding is disclosed. The system includes a transmitting device that comprises an LDPC encoder for determining an initial number of OFDM symbols (Nsym_init) based on the number of information bits to be delivered in a packet. The LDPC encoder determines a number of extra symbols (Nsym_ext) value used for OFDM modulation that is based on the Nsym_init value. A final number of symbols Nsym value used for OFDM modulation of the packet is based on the Nsym_init value and the Nsym_ext value. The transmitting device also includes an extension calculator for generating an Nldpc_ext value based on the STBC value and the Nsym_ext value. The Nldpc_ext value is used for purposes of determining LDPC parameters associated with the packet.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
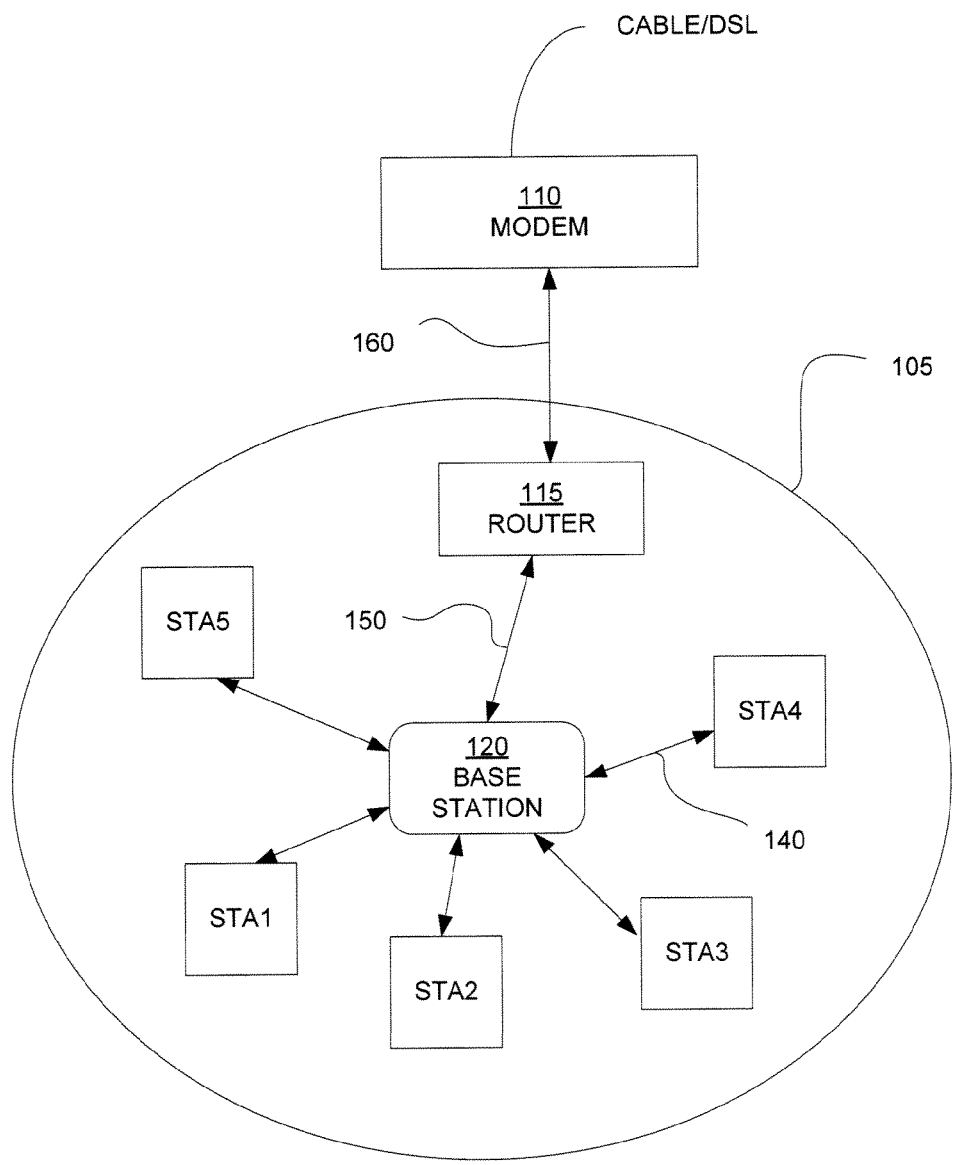
FIG. 1 is a block diagram showing a wireless LAN upon which embodiments according to the invention can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present disclosure provide systems and methods for transmitting a low density parity check (LDPC) signal in compliance with new wireless transmission standards, such as, IEEE 802.11ac and its derivatives. In some cases, there is no need to change the encoding process used for the previously employed IEEE 802.11n standard. In other cases, there is a reduction in the number of bits delivered used to determine LDPC parameters, which results in less puncturing (or more repetition) which will improve performance.

While embodiments of the present invention are described in relation to implementation of LDPC coding in the IEEE 802.11ac standard and its derivatives, which in draft or approved form is incorporated herein in its entirety, the methods and systems for LDPC encoding described herein are also implementable within various other wireless standards in various other embodiments of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "receiving," "sending," "broadcasting," "determining," "generating," "signaling," "calculating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an exemplary wireless LAN network 105 according to an embodiment of the present invention. Stations STA-1 through STA-5 are capable of wirelessly receiving data from and transmitting data to a base station 120, which may be, for example, a wireless access point (AP). The 802.11 very high throughput (VHT) standard proposes raw data transport raw rates up to 6.933 Gbps (gigabits per second) wirelessly and reliably. The base station 120 communicates with a router 115 either via a wire or wirelessly. In the example of FIG. 1, the router 115 has network connectivity via a cable modem 110, generally through a wire 160.

Figure 2:
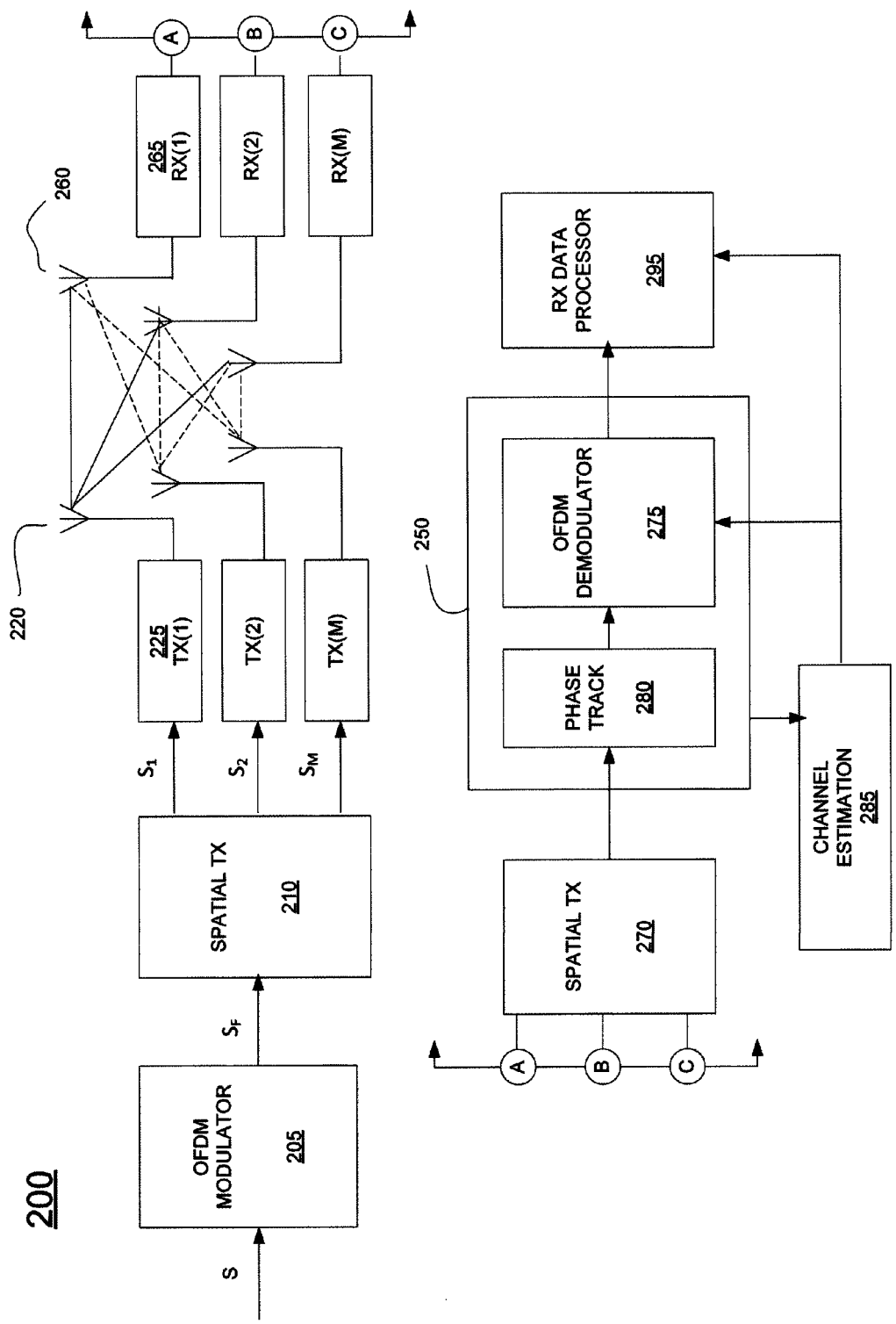
FIG. 2 is a block diagram illustrating a wireless transmission and reception system upon which embodiments according to the invention can be implemented.

FIG. 2 is a block diagram of a wireless transmission and reception node complex 200. Stream S is a "to be transmitted" stream, and is prepared based on payload data, and is encoded with a preamble (also known as a header in this Application) and other information before being fed into an encoder and modulator block 205 (e.g., OFDM modulator). The node complex 200 consists of M antennas 220 in the transmit direction and N antennas 260 on reception to form a M-by-N multiple inputs, multiple outputs (MIMO) system. The node complex 200, while operating in the MIMO mode, may use, in one embodiment, spatial division multiple access (SDMA) to communicate with several receivers. SDMA enables multiple streams that are being transmitted to different receivers at the same time to share the same frequency spectrum. Within any stream, there are packets of information that contain both payload data and a preamble.

Simultaneous multiple stream transmission leads to higher bandwidth. To achieve simultaneity, each data stream is spatially pre-coded and then transmitted through a different transmit antenna. This spatial pre-coding and processing is done by block 210. This results in a sequence of code symbols which are mapped to a signal group to produce a sequence of modulation symbols.

A MIMO system may support a number of modulation schemes, including orthogonal frequency division multiplexing (OFDM). OFDM is a spread spectrum technique that distributes data over a number of sub-carriers spaced apart at precise frequencies. The spacing is orthogonal and enables a receiver to recover data. More particularly, data is collected into blocks of data as symbols. These blocks are encoded for error protection and then interleaved across various designated sub-carriers, such that the loss of one or more sub-carriers due to signal cancellation or interference is recoverable. This modulation technique may be employed using any wireless standard including IEEE 802.11ac VHT. The OFDM modulator 205 splits the modulation symbols into a number of parallel streams. An inverse fast Fourier transform (FFT) is performed on each set of sub-carriers to produce time domain OFDM symbols. The OFDM symbols are distributed in the payloads of multiple data packets. A preamble is carried along with the payload in each data packet. The preamble includes several symbols that are split into parallel streams similar to data. The preamble is appended to the data payload prior to spatial processing. Different spatial streams are transmitted through a plurality of antennas using radio frequency (RF) transceivers 225.

The transmitted information is received on the antennas 260 and fed into receivers 265 to recover the information modulated on the RF carriers. The recovered information is provided to spatial transmitter 270. A preamble processor, such as, the phase tracker 280, uses the preamble to provide synchronization information to the OFDM demodulator 275 and other downstream processing components 295, such as, receive data processor. The OFDM demodulator 275 converts the stream from the time domain to the frequency domain using FFT. The frequency domain includes a stream per sub-carrier. The channel estimator 285 receives information from the phase tracker 280 and estimates the channel response. Channel estimation response outputs are provided to OFDM demodulator 275 and the receive data processor 295. As part of the preamble, there are pilot tones which are phase-shifted due to transmission through the wireless channels. One phase shift is due to relative frequency residual offsets between the phase lock loops at reception and transmission and is generally linear. Another phase shift occurs due to phase noise.

Generally, LDPC error coding has significant gain over binary convoluted coding (BCC) that may also be used for error coding. For instance, LDPC results in low implementation costs and can be constructed for high speed implementation. As such, LDPC is suitable for use in IEEE 802.11n and IEEE 802.11ac systems.

More particularly, in wireless systems implementing LDPC error coding within an OFDM modulation technique, there are two constraints involved in determining LDPC coding parameters and packet length. The first constraint dictates that the number of OFDM symbols (Nsym) should be an integer number. Additionally, Nsym may be an even integer number if STBC is used, wherein STBC is a transmitter diversity technique of spreading the transmit signal over multiple antennas to improve reception. The second constraint dictates that the number of codewords (New) also should be an integer number.

Figure 3:
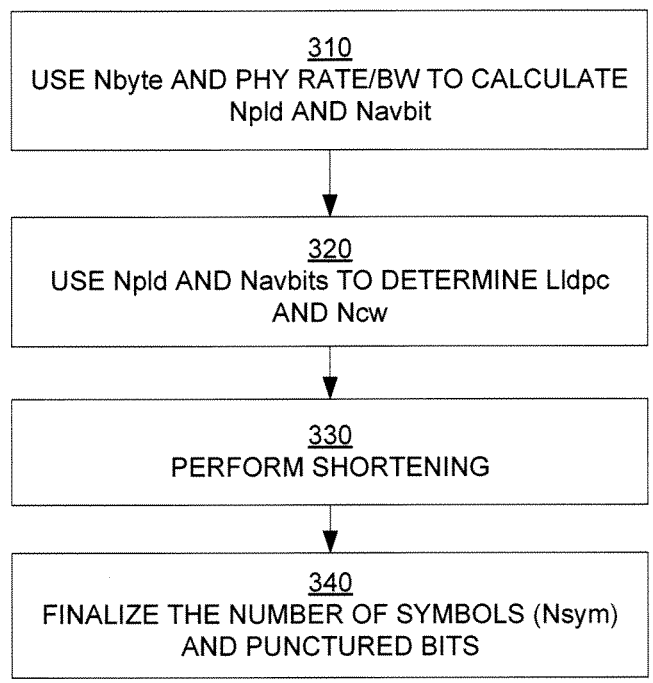
FIG. 3 is a flow chart 300 illustrating a method for LDPC encoding that is used to determine all the LDPC coding parameters, in accordance with one embodiment of the present disclosure.

FIG. 3 is a flow chart 300 illustrating a method for LDPC encoding that is used to determine all the LDPC coding parameters, in accordance with one embodiment of the present disclosure. The process outlined in flow chart 300 is implementable both within a wireless system in compliance with the IEEE 802.11n standard, and also within the proposed IEEE 802.11ac standard with or without modification, and is intended to provide a general background for encoding and decoding LDPC parameters. That is, IEEE 802.11n LDPC codes are suitable for IEEE 802.11ac implementation because of significant gain over binary convolution coding (BCC), implementation friendly construction, and an efficient encoding process with shortening and puncturing. As such, by following and/or modifying the steps in flow chart 300, a transmitting device and a receiving device are able to generate, derive, and/or determine all LDPC coding parameters associated with a particular packet of information. For purposes of clarity and illustration, not all encoding operations used in compliance with 802.11n and 802.11ac standards may be included within flow chart 300, but are equally applicable At 310, the number of information bits as configured in bytes (Nbytes) and other parameters including PHY rate/BW (coding rate and bandwidth at the physical layer) are used to calculate Npld (number of bits in the data structure PSDU and SERVICE field) and the number of available bits (Navbits) in the minimum number of OFDM symbols used for a data field of a packet. Navbit and Nsym_init are calculated to meet the first constraint, wherein Nsym is an integer. At 320, Npld and Navbits are used to determine Lldpc (the codeword length) and New (the number of codewords). That is, the integer number of LDPC codewords (New) to be transmitted is determined, as well as the length of the codewords (Lldpc) to be used. At 330, the number of shortening bits (Nshrt) is calculated or determined. The shortening bits are padded to the Npld data bits. At 340, the final number of symbols (Nsym) in a packet is determined, and includes performing a puncturing operation to determine an initial number of punctured bits (Npunc). If Npunc is too large, to avoid performance loss, extra OFDM symbols may be added to the packet, which are included in the final Nsym value, as shown in Eqn. 1, wherein New and Nshrt values are unchanged, and Npunc may be reduced or replaced by using repetition if Npunc becomes negative:

$$\text{Nsym}=\text{Nsym\_init}+\text{Nsym\_ext} \quad (1)$$

Previously, wireless devices implementing the IEEE 802.11n standard were able to convey LDPC parameters between the transmitting device and the receiving device by including Nbytes, the number of bytes of sourced information, which is based on Npld. The receiving device would be able to derive pertinent LDPC parameters from the Nbyte value.

In the proposed IEEE 802.11ac, wireless devices will signal Nsym in the signal field (e.g., field 479) as opposed to signaling Nbyte information in IEEE 802.11n. A receiving device just receiving Nsym is unable to derive all the LDPC parameters, because in part, it is unable to derive Nsym_init, and even if Nsym_init were calculated, there is no one-to-one mapping between Nsym_init and Npld for a given PHY rate (R) and BW (bandwidth), due to ceiling functions used during the LDPC encoding process to calculate Nsym_init and/or Navbits.

Embodiments of the present invention are able to effectively signal between the transmitting device and the receiving device information necessary for the receiving device to derive all LDPC coding parameters (e.g., Ncw, Lldpc, Nshrt, Npunc, Nrep, etc.). In particular, the receiving device is able to derive Npld and/or Nbyte given Nsym, as well as additional information Nldpc_ext which can be used to derive the number of symbols added as an extension to the packet. By including or inferring the value of Nldpc_ext, all LDPC parameters are derivable using operations based on flow chart 300.

Figure 4:
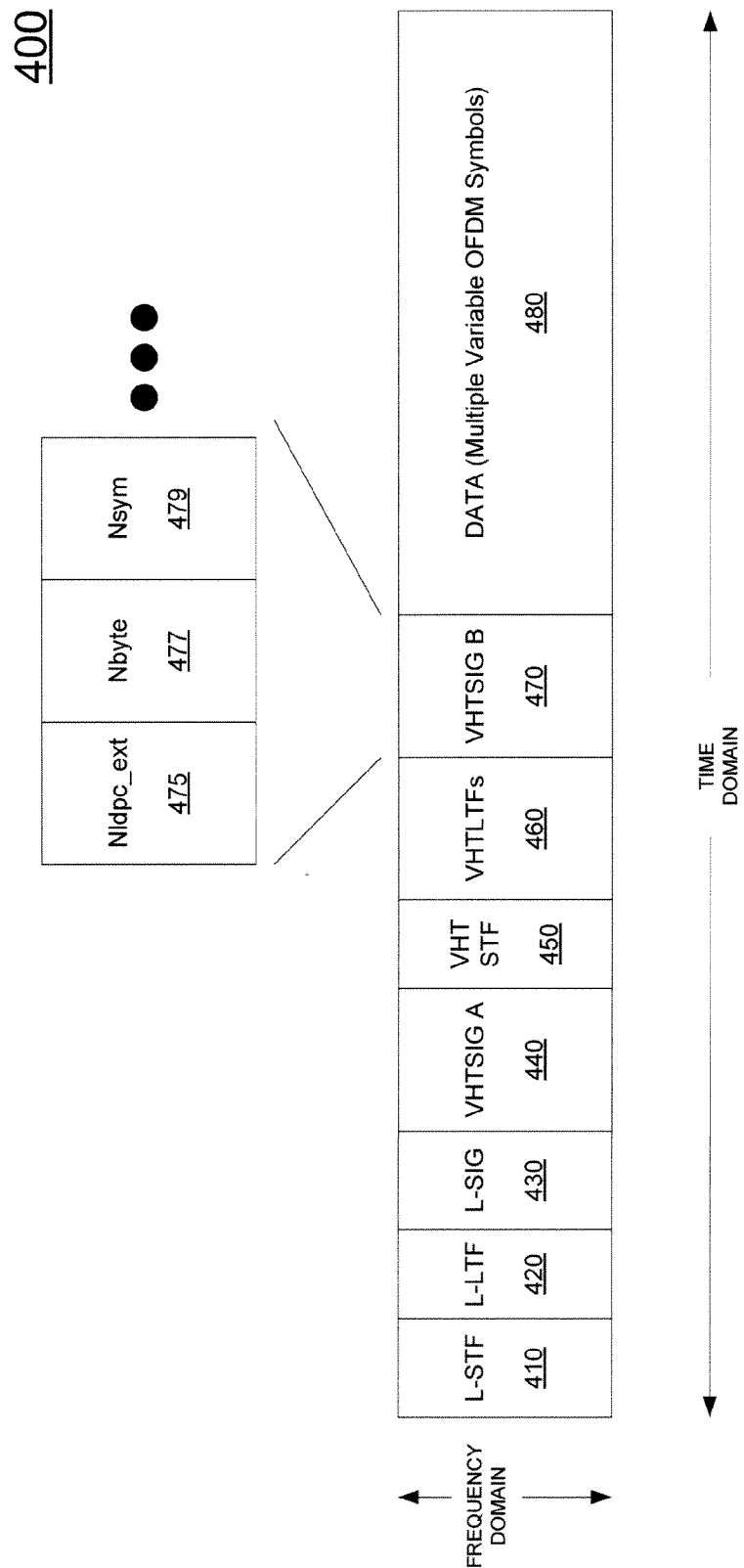
FIG. 4 is an example of a frame structure for a Physical Layer Convergence Protocol (PLCP) frame used in wireless communications according to embodiments of the present invention.

FIG. 4 is an example representation of an exemplary Physical Layer Convergence Protocol (PLCP) frame 400 that is configured to include information allowing for the derivation of LDPC parameters, in accordance with one embodiment of the present disclosure. In particular, information inferred or included within frame 400 is implementable within a wireless system in compliance with the IEEE 802.11ac standard, in one embodiment. As such, LDPC parameters are derivable given, in part, the specified Nsym value provided within a delivered packet of information.

As shown in FIG. 4, the frame 400 includes payload data packed as OFDM symbols in a data field 480 as well as preamble information. The preamble information includes the training sequences classified as "L" type for legacy and as "VHT" type for the newly defined very high-throughput training sequences particular to standards such as IEEE 802.11ac. For instance, legacy training files includes the legacy Short Training field (L-STF) 410, legacy Long Training field (L-LTF) 420, and legacy Signal field (L-SIG) 430. In addition, VHT training fields include the VHT Signal A field (VHTSIG A) 440, VHT Signal B field (VHTSIG B) 470, very high-throughput start of packet detection field (VHT STF) 450, and VHT Long Training field (VHT-LTF) 460. In an M-by-N MIMO system, the preamble will include N numbers of VHT-LTFs. These symbols, like data symbols, include a mix of known training sequences. The OFDM transmit processor places the preamble at the front of the packet data during formation of the "to be modulated" symbols. In various embodiments of the present invention, information such as, Nldpc_ext value 475, the Nbyte value 477, and/or the Nsym value 479 may be included for purposes of deriving LDPC parameters.

In one embodiment, as shown in FIG. 4, Nbytes 477 indicating the number of information bytes is signaled in the VHTSIG B filed 470. As such, Nbyte information along with physical layer rate (PHY rate R) and bandwidth (BW) information are enough for a receiving device to derive all pertinent LDPC parameters. A device using this process need not change the IEEE 802.11n LDPC encoding process when implementing wireless communication using the IEEE 802.11ac standard, in one implementation.

Figure 5:
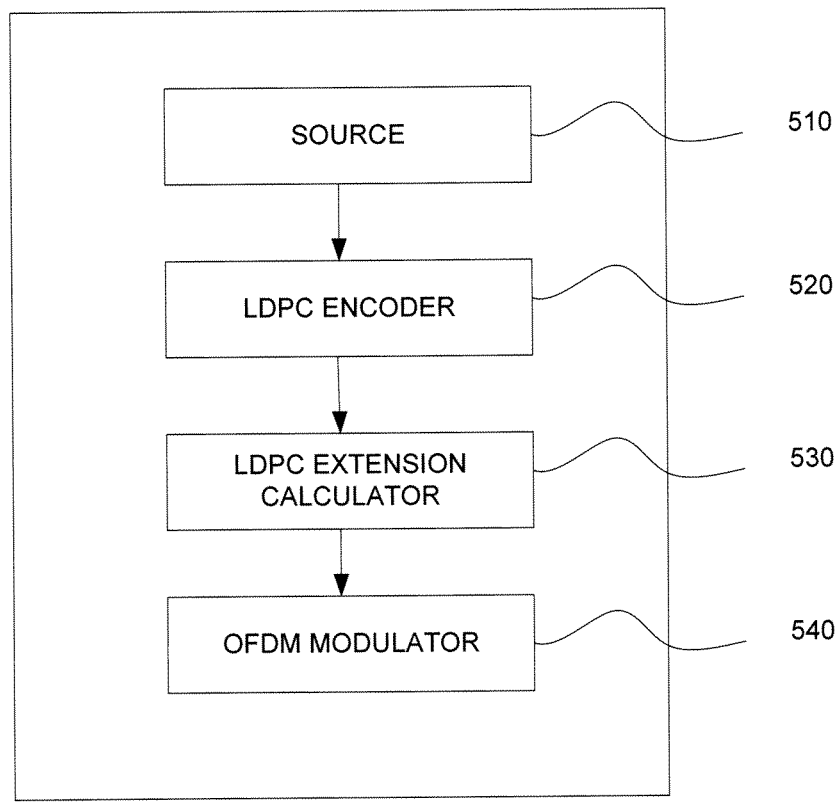
FIG. 5 is a block diagram of a system configured to implement a method for LDPC encoding that is used to determine all the LDPC coding parameters, in accordance with one embodiment of the present disclosure.

FIG. 5 is a block diagram of a system 500 configured to implement a method for LDPC encoding that is used to determine all the LDPC coding parameters, in accordance with one embodiment of the present disclosure. In one implementation, system 500 as shown in FIG. 5 includes a transmitting device that is performing LDPC encoding in association with a packet of information that is deliverable to a receiving device. Information included or inferred within the data structure allows for derivation of all pertinent LDPC parameters.

As shown in FIG. 5, an LDPC encoder 520 located within a transmitter of system 500 accepts input data from an information source 510 and outputs coded stream data including higher redundancy that is suitable for error correction processing at a receiving device. In particular, data is provided by information source 510 in a signal encoding process.

The LDPC encoder 520 is configured to determine an initial number of OFDM symbols (Nsym_init) based on the number of information bits to be delivered in a packet. This Nsym_init value is determined in order to derive the final Nsym value that is deliverable within the information packet, in compliance with the IEEE 802.11ac standard.

During the calculation of the Nsym value, as outlined flow chart 300 as well as the specification for the IEEE 802.11ac standard, which was previously fully incorporated herein, the LDPC encoder 520 determines a number of extra symbols, (herein referred to as the Nsym_ext value) that is based on the Nsym_init value. The Nsym value as determined meets the constraint of being an integer number, and is based on the Nsym_init value and the Nsym_ext value in Equation 2:

$$\text{Nsym} = \text{Nsym\_init} + \text{Nsym\_ext} \qquad (2)$$

Additionally, extra symbols based on LDPC coding are provided in VHT-SIG A or B of the data. In particular, LDPC extension calculator 530 at the transmitting device generates an Nldpc_ext bit/value, that is based on the STBC value and the Nsym_ext value for purposes of determining LDPC parameters associated with the packet, in the below provided Equation 3. The generation of Nldpc_ext assures compliance with the second constraint, where Ncw is an integer.

$$\text{Nldpc\_ext} = \frac{(1 + STBC)}{\text{Nsym\_ext}} \qquad (3)$$

As shown in FIG. 5, the OFDM modulator 540 is configured to modulate the encoded messages from the LDPC encoder 520 into signal waveforms that are then transmitted to the receiving device.

Figure 6:
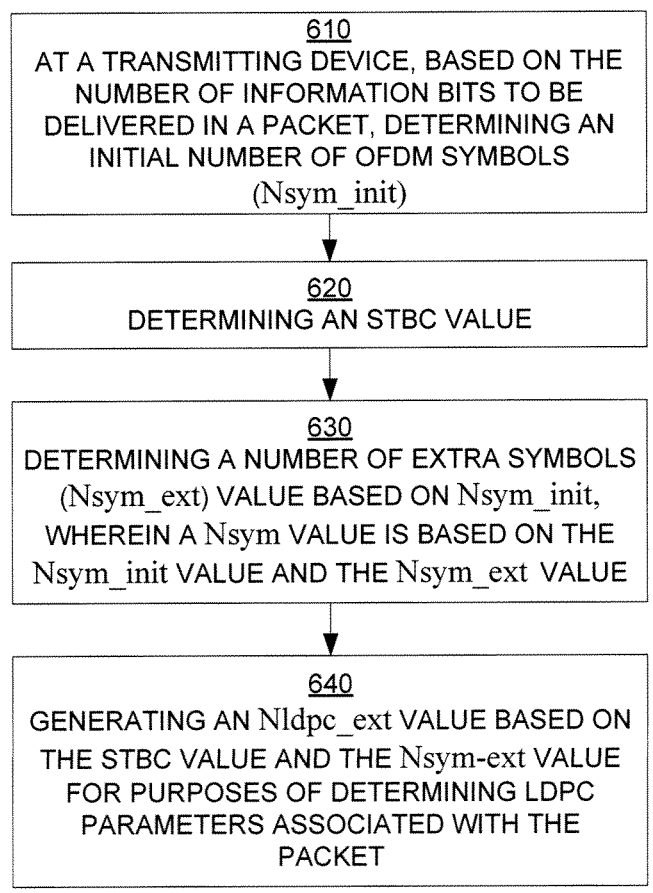
FIG. 6 is a flow chart 300 illustrating a method for providing an LDPC signal and includes accessing data in an encoding operation and associating information with the data to determine LDPC coding parameters, in accordance with one embodiment of the present disclosure.

FIG. 6 is a flow chart 600 of a process used for providing an LDPC signal and includes accessing data in an encoding operation and associating information with the data to determine LDPC coding parameters, in accordance with one embodiment of the present disclosure. Access is provided to the information that is used to determine coding parameters. For instance, flow chart 600 is implemented to provide LDPC information when delivering wireless packets of information in compliance with the IEEE 802.11ac standard. In one implementation, system 500 is configured to implement the method of flow chart 600.

In particular, at step 610, an initial number of OFDM symbols (Nsym_init) is determined at a transmitting device. The Nsym_init value is based on the number of information bits to be delivered in a packet, as previously described. At step 620, a determination is made as to whether space time block coding (STBC) is employed, as reflected in an STBC value, wherein STBC is a transmitter diversity technique of spreading the transmit signal over multiple antennas to improve reception.

The Nsym_init is used to ultimately derive the final Nsym value that is deliverable within the information packet. Specifically, at step 630 a number of extra symbols (as expressed by the Nsym_ext value) is determined that is based on the Nsym_init value. A final number of symbols ($N_{sym}$) value is based on the Nsym_init value and the Nsym_ext value, as expressed in Equation 2. Shortening and puncturing operations are performed to determine the extra number of symbols (Nldpc_ext), and to derive Nsym, as previously discussed. The Nsym value is signaled within the information packet.

Additionally, an Nsym_ext value is generated at the transmitting device that is based on the STBC value and the Nldpc_ext value. Specifically, once Nldpc_ext is known, the Nsym_ext is generated based on the STBC value. Nsym_ext can take on values between 0-2 depending on the STBC value, as reflected in Equation 3. Nldpc_ext, as one bit of information, provides for LDPC parameter derivation in combination with the required Nsym value. The Nldpc_ext value is deliverable within the information packet.

As such, the combination of the Nldpc_ext value and the STBC value, both of which are delivered in the information packet, is used by the receiving device to derive Nsym_ext, as well as all other pertinent LDPC parameters. Specifically, at the receiving device, the information packet is received from the transmitting device, and the Nldpc_ext bit/value and Nsym values are parsed from the header and/or signal field of the information packet by an LDPC decoder. Nsym_ext is derived based on the STBC value and the Nldpc_ext value. In addition, the Nsym_init value is derivable based on the Nldpc_ext (used to derive the Nsym_ext value) and the Nsym value.

Table 1 illustrates the use of the Nldpc_ext value for associating the STBC, Nsym_ext, and Nldpc_ext values. In particular, the values in Table 1 can be used to generate Nldpc_ext at the transmitting device given Nsym_ext, and/or can be used by the receiving device to derive Nsym_ext given Nldpc_ext. As shown, when STBC is 0, Nldpc_ext is 0 when Nsym_ext is 0, and Nldpc_ext is 1 when Nsym_ext is 1. Also, when STBC is 1, Nldpc_ext is 0 when Nsym_ext is 0, and Nldpc_ext is 1 when Nsym_ext is 2.

TABLE 1

| STBC | Nsym_ext choices | Nldpc_ext | Nsym_ext |
| --- | --- | --- | --- |
| 0 | 0 or 1 | 0 | 0 |
| 0 | 0 or 1 | 1 | 1 |
| 1 | 0 or 2 | 0 | 0 |
| 1 | 0 or 2 | 1 | 2 |

To align values of Nsym_init and Npld for purposes of deriving Nsym_init at the receiving device, a one-to-one mapping between Nsym_init and Npld is guaranteed when performing MAC/PHY padding to align Npld with the OFDM symbol boundary before the LDPC encoding process. That is, padding is performed at the MAC layer and maximized such that the maximum number of bytes in a packet to ensure one-to-one mapping between Nsym_init and Npld, as expressed in Equation 4:

$$\text{Npld} = \text{Nsym\_init} * \text{Ncbps} * R = \text{Nsym\_init} * \text{Ndbps} \quad (4)$$

Where Ndbps is defined as the number of data bits per symbol, Ncbps is defined as the number of coded bits per symbol, and R is the coding rate.

In still another embodiment, extra symbols (Nsym_ext) are always delivered regardless of the value of Npunc, as determined in operation 340 of FIG. 3. That is, Nsym_ext is either 1 or 2 if STBC is used. In that manner, Nldpc_ext is assumed to be 1, for purposes of applying values in Table 1. As such, Nldpc_ext need not be delivered in the packet of information. Based on Table 1, Nsym_init is derivable, as expressed in Equation 5:

$$\text{Nsym\_init} = \text{Nsym} - 1 \quad (5)$$

Also, if STBC is used, then Nsym_init is derivable, as expressed in Equation 6:

$$\text{Nsym\_init} = \text{Nsym} - 2 \quad (6)$$

That is, according to Table 1, at the receiver, assuming that Nldpc_ext is 1, Nsym_ext is determined to be 1 when STBC is 0, and Nsym_ext is determined to be 2 when STBC is 1. Additionally, for alignment of Npld with Nsym_init, MAC/PHY padding is defined to align Npld with OFDM symbol boundary before LDPC encoding in one implementation, as previously described.

Thus, according to embodiments of the present invention, systems and methods for transmitting a low density parity check (LDPC) signal in compliance with new wireless transmission standards, such as, IEEE 802.11ac and its derivatives are described. In one embodiment, there is a reduction in the number of bits delivered (the one-bit Nldpc_ext value) used to determine LDPC parameters, which results in less puncturing (or more repetition) which will improve performance.

While the foregoing disclosure sets forth various embodiments using specific block diagrams, flow charts, and examples, each block diagram component, flow chart step, operation, and/or component described and/or illustrated herein may be implemented, individually and/or collectively. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed:

1. A method for low density parity check (LDPC) encoding, comprising:
    at a transmitting device, based on a number of information bits to be delivered in a packet, determining an initial number of orthogonal frequency division multiplexing (OFDM) symbols;
    determining a space time block coding (STBC) value; and
    determining a number of extra symbols value based on said initial number of OFDM symbols, wherein a final number of OFDM symbols is based on said initial number of OFDM symbols and said number of extra symbols value;
    generating an LDPC extension value based on said STBC value and said number of extra symbols value for purposes of determining LDPC parameters associated with said packet;
    encoding said LDPC extension value in a header of said packet,
    wherein when said STBC value is 0 and said number of extra symbols value is 0, then said LDPC extension value is 0;
    wherein when said STBC value is 0 and said number of extra symbols value is 1, then said LDPC extension value is 1;
    wherein when said STBC value is 1 and said number of extra symbols value is 0, then said LDPC extension value is 0; and
    wherein when said STBC value is 1 and said number of extra symbols value is 2, then said LDPC extension value is 1;
    at a receiving device, when said LDPC extension value is 1,
    determining said number of extra symbols value is 1 when said STBC value is 0; and
    determining said number of extra symbols value is 2 when said STBC value is 1.

2. The method of claim 1, wherein said determining said number of extra symbols value comprises:
    performing shortening and puncturing operations to determine said final number of OFDM symbols; and
    signaling said final number of OFDM symbols in said packet.

3. The method of claim 1, further comprising:
    at said receiving device, receiving said packet from said transmitting device;
    parsing said LDPC extension value from said header of said packet;
    parsing said final number of OFDM symbols from a signal field of said packet;
    determining said number of extra symbols value based on said STBC value and said LDPC extension value; and
    determining said initial number of OFDM symbols based on said LDPC extension value and said final number of OFDM symbols.

4. The method of claim 1, wherein said packet is in compliance with an IEEE 802.11 ac standard or its derivatives.

5. The method of claim 1, further comprising:
    wherein said final number of OFDM symbols is an integer value; and
    wherein a number of code words is an integer value.

6. The method of claim 1, further comprising:
    at said transmitting device, maximizing MAC padding to a maximum number of bytes to ensure one-to-one mapping between said initial number of OFDM symbols and a number of bits in a data structure (Npld).

7. A device handling a packet of information, wherein said packet comprises:
    a number of orthogonal frequency division multiplexing (OFDM) symbols (Nsym) value;
    a space time block coding (STBC) value;
    a number of extra symbols for low density parity check (LDPC) parameter determination associated with said packet (Nldpc_ext) value based on said STBC value and a number of extra symbols (Nsym_ext) value determined for said packet based on an initial number of OFDM symbols (Nsym_init),
    wherein when said STBC value is 0 and said Nsym_ext value is 0, then said Nldpc_ext value is 0;
    wherein when said STBC value is 0 and said Nsym_ext value is 1, then said Nldpc_ext value is 1;
    wherein when said STBC value is 1 and said Nsym_ext value is 0, then said Nldpc_ext value is 0; and
    wherein when said STBC value is 1 and said Nsym_ext value is 2, then said Nldpc_ext value is 1.

8. The device of claim 7, wherein said packet is in compliance with an IEEE 802.11 ac standard or its derivatives.

9. A device for interpreting a packet of information, wherein said packet comprises:
    a number of orthogonal frequency division multiplexing (OFDM) symbols (Nsym) value; and
    a space time block coding (STBC) value;
    wherein when a number of extra symbols for low density parity check (LDPC) parameter determination associated with said packet (Nldpc_ext) value, based on said STBC value and a number of extra symbols (Nsym_ext) value, is 1 for said packet,
    when said STBC value is 0, then said Nsym_ext value is 1, and
    when said STBC value is 1, then said Nsym_ext value is 2.

10. A system for low density parity check (LDPC) encoding, comprising:
    at a transmitting device, an LDPC encoder for determining an initial number of orthogonal frequency division multiplexing (OFDM) symbols (Nsym_init) value based on a number of information bits to be delivered in a packet, wherein said LDPC encoder determines a number of extra symbols (Nsym_ext) value based on said Nsym_init value, wherein an Nsym value is based on said Nsym_init value and said Nsym_ext value; and
    at said transmitting device, an extension calculator for generating a number of extra symbols for LDPC parameter determination associated with said packet (Nldpc_ext) value based on a space time block coding (STBC) value and said Nsym_ext value,
    wherein said LDPC encoder at said transmitting device encodes said Nldpc_ext value in a header of said packet;
    wherein when said STBC value is 0 and said Nsym_ext value is 0, then said Nldpc_ext value is 0;
    wherein when said STBC value is 0 and said Nsym_ext value is 1, then said Nldpc_ext value is 1;
    wherein when said STBC value is 1 and said Nsym_ext value is 0, then said Nldpc_ext value is 0; and
    wherein when said STBC value is 1 and said Nsym_ext value is 2, then said Nldpc_ext value is 1;
    at a receiving device configured to receive said packet from said transmitting device, a parser for parsing said Nldpc_ext value from said header of said packet, and for parsing said Nsym value from a signal field of said packet; and
    at said receiving device, an LDPC decoder for determining said Nsym_ext value based on said STBC value and said Nldpc_ext value and for determining said Nsym_init value based on said Nldpc_ext value and said Nsym value, wherein at said receiving device, said LDPC decoder determines that said Nsym_ext value is 1 when said Nldpc_ext value is 1 and said STBC value is 0; and said LDPC decoder determines that said Nsym_ext value is 2 when said Nldpc_ext value is 1 and said STBC value is 1.

11. The system of claim 10, wherein said LDPC encoder performs shortening and puncturing operations to determine said Nsym_ext value, and signals said Nsym value in said packet.

12. The system of claim 10, wherein said extension calculator assigns said Nldpc_ext value to 1;
- wherein when said STBC value is 0, then said Nsym_ext value is 1; and
- wherein when said STBC value is 1, then said Nsym_ext value is 2.

13. The system of claim 10, further comprising:
- at said transmitting device, a MAC padder that maximizes MAC padding to a maximum number of bytes to ensure one-to-one mapping between said Nsym_init value and a number of bits in a data structure (Npld).

* * * * *